(12) United States Patent
Carstensen et al.

(10) Patent No.: US 8,709,584 B2
(45) Date of Patent: Apr. 29, 2014

(54) COMPOSITE AIRCRAFT FLOOR SYSTEM

(75) Inventors: Thomas A. Carstensen, Shelton, CT (US); David M. Cournoyer, Seymour, CT (US); Dan Ursenbach, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1179 days.

(21) Appl. No.: 11/627,491

(22) Filed: Jan. 26, 2007

(65) Prior Publication Data

US 2007/0193146 A1 Aug. 23, 2007

Related U.S. Application Data

(60) Provisional application No. 60/764,047, filed on Jan. 31, 2006.

(51) Int. Cl.
*B32B 7/08* (2006.01)

(52) U.S. Cl.
USPC ......... 428/223; 428/133; 52/787.1; 52/783.1; 244/133

(58) Field of Classification Search
USPC ........... 52/783.1, 782.1, 787.1; 244/133, 119, 244/117 R, 122 R, 123.3, 123.2, 132, 129; 428/223, 116, 117, 119, 133, 192
See application file for complete search history.

(56) References Cited

U.S. PATENT DOCUMENTS 3,093,092 A * 6/1963 Martin et al. .................... 410/85
3,285,311 A * 11/1966 Cushman ...................... 52/787.1
3,396,678 A    8/1968 Jensen
3,655,818 A * 4/1972 Mckown ........................ 428/118
4,344,995 A * 8/1982 Hammer ......................... 428/61
4,528,051 A * 7/1985 Heinze et al. .................... 156/92
4,593,870 A    6/1986 Cronkhite et al.
4,599,255 A * 7/1986 Anglin et al. .................... 428/73
4,622,091 A * 11/1986 Letterman ...................... 156/286
4,786,343 A * 11/1988 Hertzberg ........................ 156/93
5,344,685 A * 9/1994 Cassell .......................... 428/64.1
5,417,385 A * 5/1995 Arnold et al. ................... 244/1 A
5,451,015 A    9/1995 Cronkhite et al.
5,569,344 A * 10/1996 Grimnes ......................... 156/90
5,604,010 A * 2/1997 Hartz et al. ..................... 428/118
5,667,859 A * 9/1997 Boyce et al. .................... 428/59
5,736,222 A * 4/1998 Childress ....................... 428/119
5,741,574 A * 4/1998 Boyce et al. ................... 428/119
5,869,165 A * 2/1999 Rorabaugh et al. ........... 428/105

(Continued)

OTHER PUBLICATIONS

PCT Search Report and Written Opinion, dated Apr. 9, 2008.

(Continued)

*Primary Examiner* — Robert Canfield
*Assistant Examiner* — Babajide Demuren
(74) *Attorney, Agent, or Firm* — Carlson, Gaskey & Olds, P.C.

(57) ABSTRACT

An aircraft floor system includes a composite panel which generally includes an inboard layer, an inboard interlock layer, a core layer, an outboard interlock layer and an outboard layer. The advanced sandwich core material may include K-Cor™ or X-Cor™ which is pinned through at least one ply of dry composite reinforcement to provide a mechanical lock between the pins and an inboard and outboard interlock layer. Bonding of the locked-in ply with the inboard and outboard results in improved structural performance and damage tolerance.

28 Claims, 10 Drawing Sheets

(56) References Cited

U.S. PATENT DOCUMENTS

| | | | |
|---|---|---|---|
| 5,895,699 A * | 4/1999 | Corbett et al. | 428/116 |
| 5,919,413 A * | 7/1999 | Avila | 264/249 |
| 5,935,680 A * | 8/1999 | Childress | 428/119 |
| 5,958,550 A | 9/1999 | Childress | |
| 6,138,949 A | 10/2000 | Manende et al. | |
| 6,180,206 B1 * | 1/2001 | Kain, Jr. | 428/116 |
| 6,291,049 B1 * | 9/2001 | Kunkel et al. | 428/99 |
| 6,298,633 B1 * | 10/2001 | McCorkle et al. | 52/787.1 |
| 6,427,945 B1 | 8/2002 | Bansemir | |
| 6,513,756 B1 | 2/2003 | Lambiaso | |
| 6,544,619 B1 * | 4/2003 | Buzzi | 428/76 |
| 6,554,225 B1 | 4/2003 | Anast et al. | |
| 6,739,861 B2 | 5/2004 | Cournoyer | |
| 6,843,525 B2 | 1/2005 | Preisler | |
| 6,959,894 B2 | 11/2005 | Hayashi | |
| 7,100,885 B2 | 9/2006 | Zerner | |
| 7,124,982 B2 | 10/2006 | Brofeldt | |
| 2003/0098520 A1 * | 5/2003 | Cournoyer et al. | 264/156 |
| 2004/0055248 A1 * | 3/2004 | Grillos | 52/783.1 |
| 2004/0121138 A1 * | 6/2004 | Carstensen | 428/304.4 |
| 2004/0128946 A1 * | 7/2004 | Salmon et al. | 52/782.1 |
| 2004/0177590 A1 * | 9/2004 | Nudo et al. | 52/783.1 |
| 2004/0197519 A1 * | 10/2004 | Elzey et al. | 428/68 |
| 2005/0051262 A1 * | 3/2005 | Erickson et al. | 156/245 |
| 2005/0058805 A1 | 3/2005 | Kimura | |
| 2005/0136276 A1 * | 6/2005 | Borup et al. | 428/528 |

OTHER PUBLICATIONS

Shonaike, Gabriel O., Suresh G. Advani, Advanced Polymeric Materials: Structure Property Relationships, CRC Press, 2003, ISBN 1587160471.

X. Zhang, L. Hounslow, M. Grassi, "Improvement of Low-Velocity Impact and Compression-After-Impact Performance by Z-Fibre Pinning," Composites Science and Technology, 66 92006); 2785-2794.

A. Marasco, D. Cartie, I. Patridge, A. Rezai, "Mechanical Properties Balance in Novel Z-pinned Sandwich Panels: out-of-plane properties," Composites Part A—revision Mar. 2005.

A. Marasco, D. Cartie, I. Partridge, "Mechanical Properties Balance in Novel Z-pinned Sandwich Panels: Out-of-plane share," CompTest 2004, Bristol, Sep. 21-23, 2004.

Pitch-Based Carbon Fiber with Low Modulus and High Heat Conduction, Nippon Steel Technical Report No. 84 Jul. 2001, pp. 12-17.

* cited by examiner

| | ORIENTATION | THICKNESS (in) |
|---|---|---|
| 46 2 ply xn-05 | [45.0] | 0.009 |
| 1 ply 196 gsm 8552 film resin | | |
| 44 4 ply IM7 plain weave prepreg | [0/-45/90/45] | 0.03 |
| 1 ply IM7 plain weave + 200 gsm Film resin | [0] | 0.008 |
| 42 Core | N/A | 0.75 |
| 40 1 ply IM7 plain weave + 200 gsm Film resin | [0] | 0.008 |
| 38 1 ply of IM7 PW prepreg (bottom) | [90] | 0.008 |

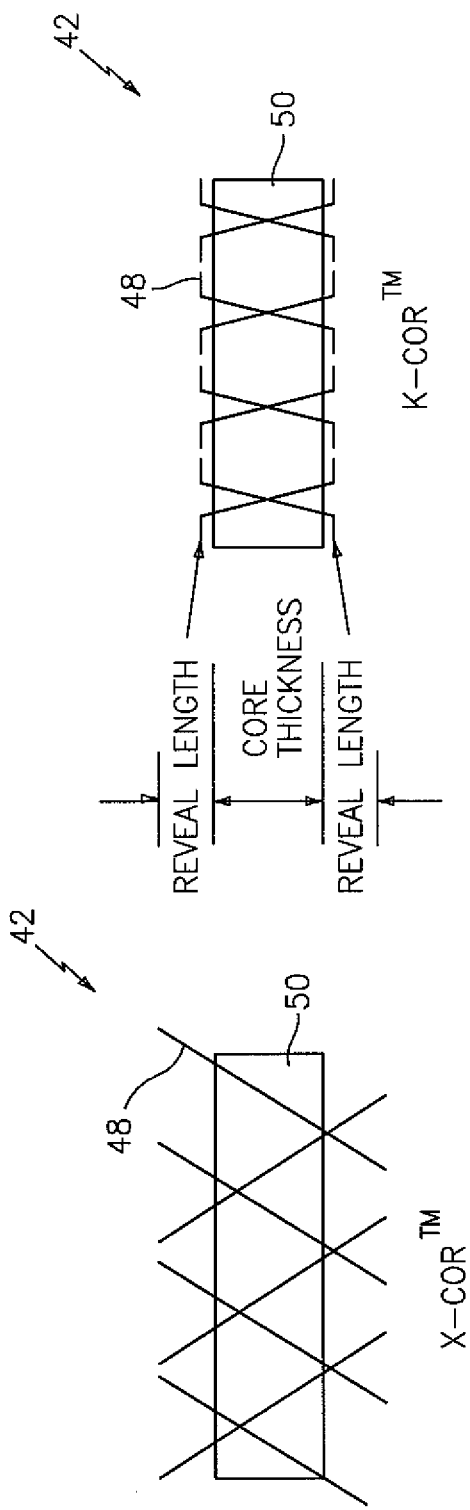

COMPOSITE AIRCRAFT FLOOR SYSTEM

The present application claims priority to U.S. Provisional Patent Application Ser. No. 60/764,047, filed Jan. 31, 2006.

This invention was made with government support under Contract No.: DAHH10-03-2-0003, awarded by the Department of Army. The government therefore has certain rights in this invention.

BACKGROUND OF THE INVENTION

The present invention relates to an aircraft floor system, and more particularly to a lightweight floor panel with an advanced sandwich core structure with a mechanical interlock.

Current aircraft floor systems incorporate thin metallic or composite prepreg skin materials adhesively bonded to either a metallic or non-metallic honeycomb core. Recent improvements in machining technology have lead to the use of high speed machined aluminum floor designs for rotary-wing aircraft. High speed machined floor designs require less tooling and have higher tolerances, but may not achieve the weight benefits of composite floor systems.

Although composite floor systems are generally lighter in weight than metallic floors, composite floor systems may be more expensive and labor intensive to manufacture compared to metallic floor systems.

Current typical aircraft composite floor system floor panels utilize a honeycomb core material with pre-cured fiberglass or prepreg composite skins bonded thereto in a large heated press or autoclave. Local hard points and edge closeouts are typically accomplished using an epoxy potting compound.

Current composite floor system floor panels may require relatively complicated and labor intensive process steps including: pre-curing of the inboard and outboard skins; cutting, machining, and forming of the honeycomb core; local densification of the honeycomb core at attachment hard points and edge closeouts; preparation of the skins and core assembly for bonding; assembly of the pre-cured skins, lay-up of film adhesive layers for bonding; curing of the assembled skins, adhesive, and core; secondary machining, densification, and splicing operations of the honeycomb core material; and multiple processing cycles in an autoclave, oven or press, to complete fabrication of an individual panel.

Moreover, usage of honeycomb core structures in rotary-wing aircraft composite floor systems may suffer inherent moisture absorption in service due to the open cell structure. Such moisture absorption may result in increased weight and resultant performance degradation over a prolonged time period.

Accordingly, it is desirable to provide a lightweight aircraft floor system that is manufactured in fewer steps yet meets or exceeds design requirements.

SUMMARY OF THE INVENTION

The aircraft floor system according to the present invention includes a composite panel with an advanced sandwich core technology which can be manufactured in a single step process using traditional prepreg autoclave processing, resin film infusion (RFI), or combinations of these techniques.

The composite panel generally includes an inboard (non-walking surface) layer, an inboard interlock layer, a core layer, an outboard interlock layer and an outboard (walking surface) layer. The advanced sandwich core material may include K-Cor™ or X-Cor™ with composite skin materials such as, for example, carbon, fiberglass, quartz, etc. depending on the desired weight, durability and cost requirements for the floor design. The K-Cor™ material is pinned through at least one ply of dry composite reinforcement to provide a mechanical lock between the pins and an inboard and outboard interlock layer resulting in improved structural performance over standard K-Cor™ materials. Moreover, damage tolerance of the floor system (i.e., impact resistance) is also increased. Composite inboard and outboard layers are then bonded to the locked-in ply.

Densification of the core layer in reinforcement areas facilitates the integration of recessed mounted components such as cargo tie-downs and seat pans as well as attachment of the aircraft floor system to the airframe.

The aircraft floor system provides: weight reduction; minimization of adhesive material; reduced potting compound usage; single co-bonding manufacturing process; and increased damage tolerance capability.

The present invention therefore provides a lightweight aircraft floor system that is manufactured in fewer steps yet meets or exceeds design requirements.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 4C is a K-Cor™ core layer;

FIG. 4D is a X-Cor™ core layer;

DETAILED DESCRIPTION OF THE DISCLOSED EMBODIMENT

Figure 1A:
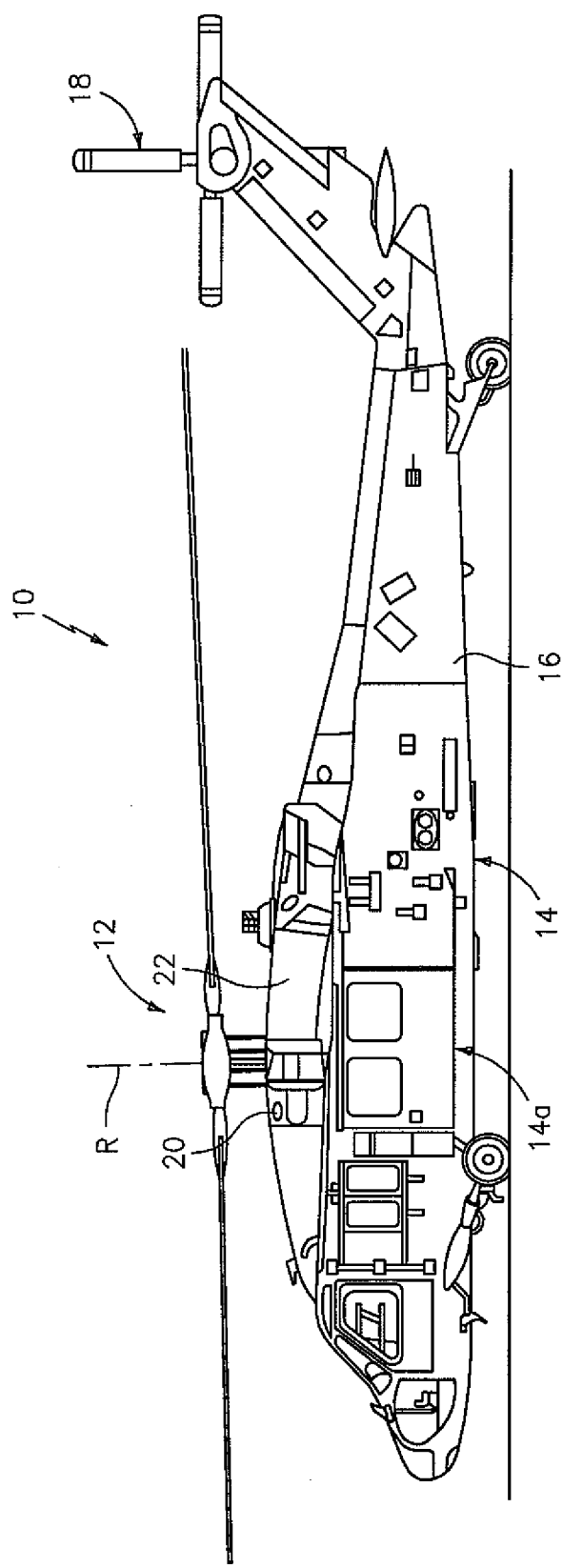
FIG. 1A is a general side perspective view of an exemplary rotary wing aircraft embodiment for use with the present invention.

FIG. 1A schematically illustrates a rotary-wing aircraft 10 having a main rotor system 12. The aircraft 10 includes an airframe 14 having an extending tail 16 which mounts a tail rotor system 18, such as an anti-torque system. The airframe 14 includes an airframe section 14A. The main rotor assembly 12 is driven about an axis of rotation R through a main gearbox (illustrated schematically at 20) by one or more engines 22. The main rotor system 12 includes a multiple of rotor blades mounted to a rotor hub. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 1B:
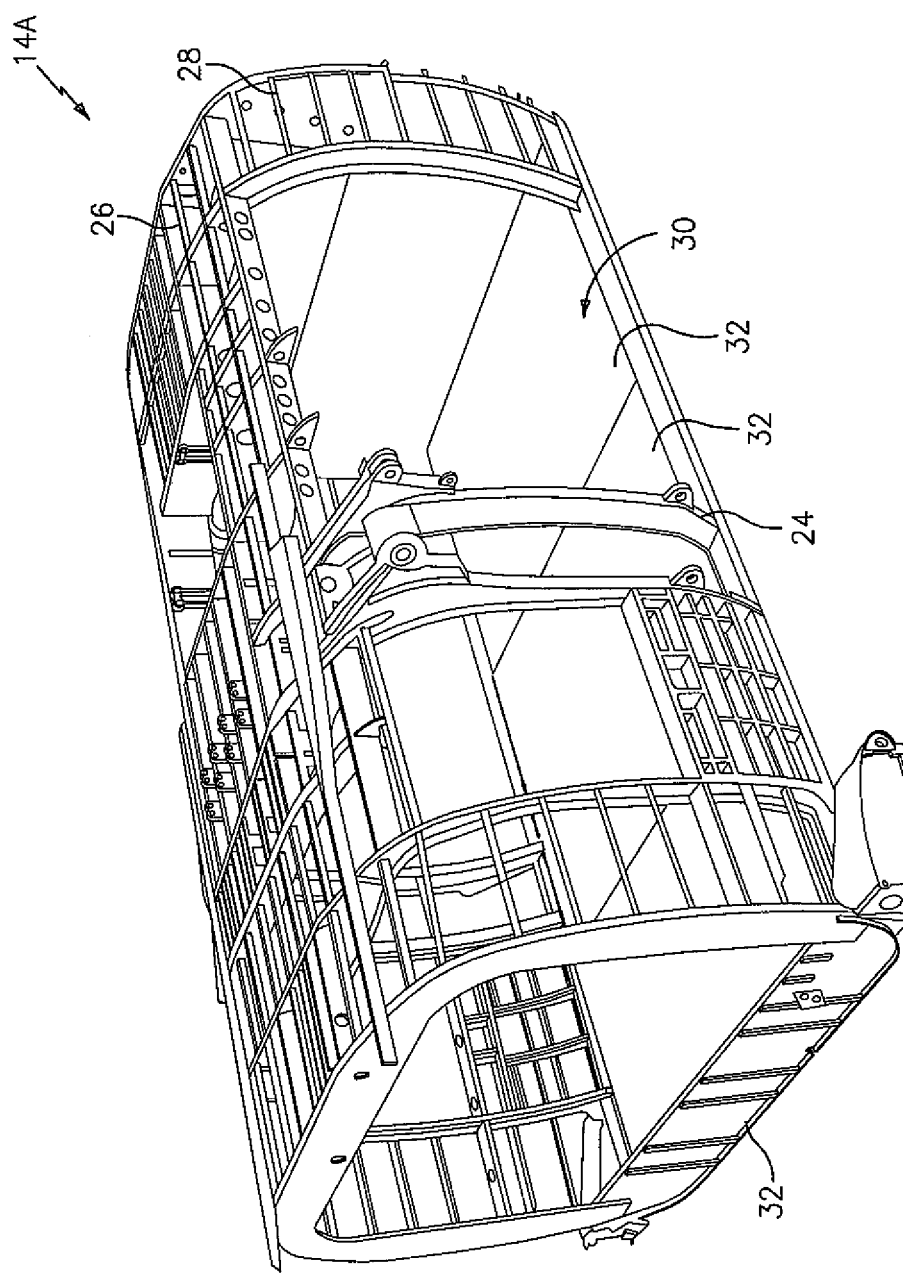
FIG. 1B is a perspective view of an airframe section of the rotary wing aircraft of FIG. 1A with an outer skin removed illustrating a floor system mounted therein.

Referring to FIG. 1B, the airframe section 14A, here illustrated as a cabin section, which may include, inter alia, a multitude of frame members 24 and a multitude of beam members 26 which support an aircraft outer skin 28 and a floor system 30 (FIG. 2) formed preferably of a multiple of composite panels 32. The multitude of frame members 24 and beam members 26 are preferably arranged in a generally rectilinear pattern, however, any arrangement may be used with the present invention.

Figure 2:
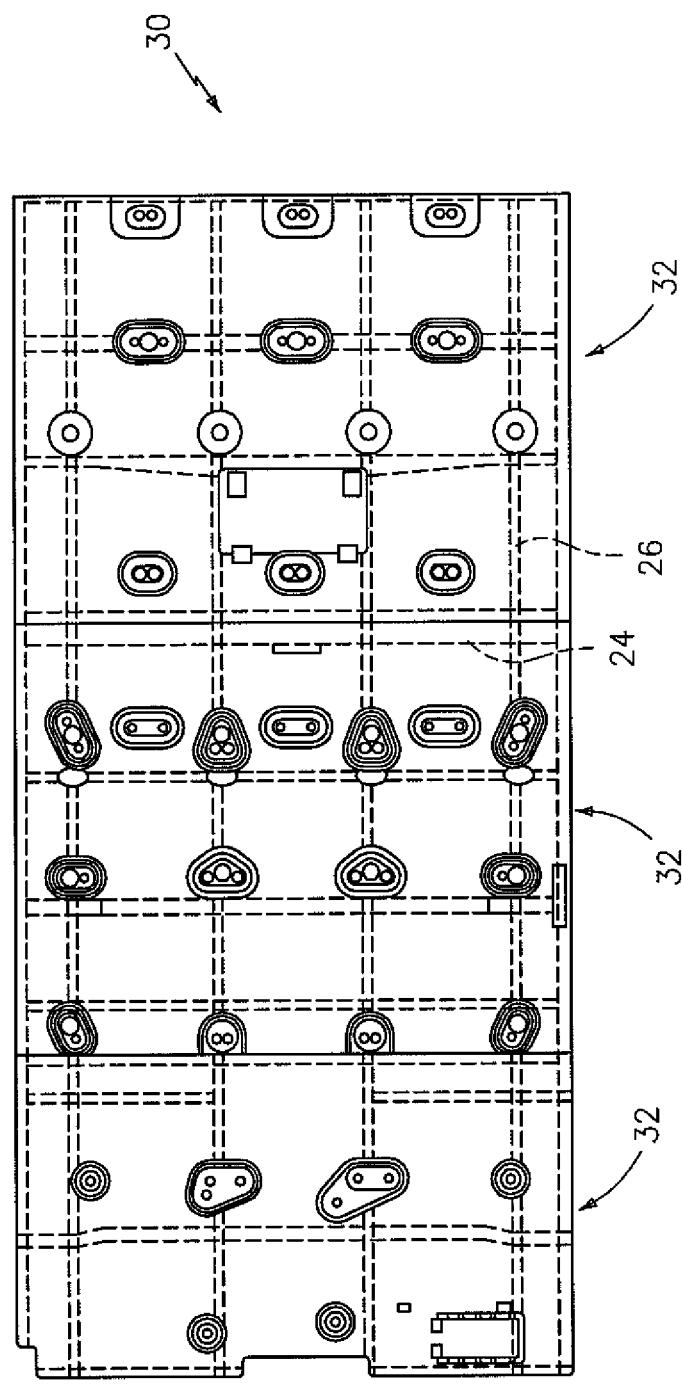
FIG. 2 is a top view of a floor system having three composite panels.

Preferably, the multi-functional floor system 30 is fabricated from the individual composite panels 32 that are, for example, mechanically attached to the existing airframe as conventionally understood. The composite panels 32 are preferably attached to the lower tub structural frame members 24 and beam members 26 through fasteners 34 which are located through a flange edge structure 36 (FIGS. 3A and 3B) of each composite panel 32. The flange edge structure 36 need only attach the composite panel 32 to the airframe section 14A as the composite panel 32 is supported upon the frame members 24 and beam members 26 (FIG. 2). Alternatively, the integrated floor system 30 can be design and manufactured as a single unit.

Figures 4A, 4B:
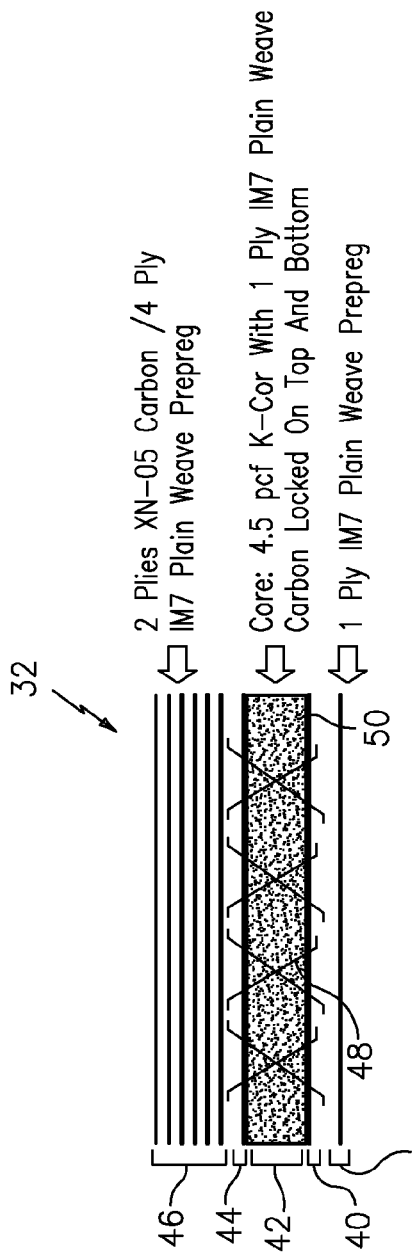
FIG. 4A is a sectional view of the floor panel illustrating the multiple of layers therein.
FIG. 4B is a chart describing the layers.

Referring to FIG. 4A, each composite panel 32 is manufactured as a sandwich structure having a multiple of layers bonded together. The composite panel 32 may be manufactured in a single step process using prepreg autoclave processing or resin infusion techniques, such as, for example, resin film infusion (RFI), or combinations of these techniques. It should be understood that other fabrication methods will also benefit from the present invention.

The composite panel 32 generally includes an inboard layer 38 (non-walking surface), an inboard interlock layer 40, a core layer 42, an outboard interlock layer 44 and an outboard layer 46 (walking surface). It should be understood that various methods may be utilized to bond each layer to the adjacent layer and that various thicknesses (number of plies) within each layer may be utilized with the present invention. It should be further understood that the composite panel 32 itself may be but one layer in a floor system 30 having a multiple of layers which may further include, for example only, an armored layer. In but one disclosed embodiment, the inboard (non-walking surface) layer 38 is approximately 0.008 inches thick, the inboard interlock layer 40 is approximately 0.008 inches thick, the core layer 42 is approximately 0.75 inches thick, the outboard interlock layer 44 is approximately 0.008 inches thick, and the outboard (walking surface) layer 46 is approximately 0.039 inches thick.

Preferably, the first two outboard surface plies of the outboard layer 46 are XN-05 woven carbon fiber that has a high compression strain. One inherent limitation of carbon fiber is that it traditionally does not strain much before it breaks (i.e., it is very brittle). The XN-05 strains much further than traditional carbon fiber when in compression, which is the state of the top surface of a panel when impacted. Since the XN-05 is a dry commodity (instead of preimpregnated with staged resin), it is combined with at least one resin film ply (FIG. 4B). Below the XN-05 are four plies of intermediate modulus woven preimpregnated carbon fabric/prepreg. The interlock layers 40, 44 preferably include one ply of dry carbon fabric (interlock layer 44) is locked-in on outboard of the core layer 42 with the pins 48 and a ply of film resin. On the bottom surface of the core layer 42, in addition to the inboard interlock layer 40, is one ply of woven carbon prepreg and a ply of film resin (FIG. 4B). It should be understood that the plies of film resin wets (supplies resin to) the interlock layers 40, 44 but becomes part of the laminate and is thus generally not considered a separate ply per se. These plies are laminated to the other plies through the film resin ply, integrating the core layer 42 with the inboard layer 38 and outboard layer 46.

The core layer 42 is preferably an advanced core material such as K-COR™ or X-COR™ (FIG. 4D) manufactured by Albany Engineered Composites. of Mansfield, Mass. USA. K-COR™ and X-COR™ can be manufactured in a multiple of forms and thicknesses. The core layer 42 includes a multiple of pins 48 which are inserted into a lightweight carrier 50 to form a truss-like support structure with the inboard interlock layer 40 and the outboard interlock layer 44. The lightweight carrier 50 is preferably a Rohacell® foam which is a 'closed cell' type foam that is highly resistant to ingress by water. This confers an advantage in situations where water absorption and freeze-thaw cycles may otherwise be problematic. The pins 48 are preferably manufactured of a non-metallic material such as carbon, fiberglass, quartz, Kevlar, ceramics or other material which provide desired mechanical, electrical and magnetic properties. The pins 48 may at least partially pierce at least one ply of the inboard interlock layer 40 and the outboard interlock layer 44 to form a bond/mechanical lock therewith.

The core layer 42 preferably incorporates K-Cor™ is a patented material manufactured by Albany Engineered Composites in which the lightweight foam carrier incorporates rigid composite pins made from fiber (i.e., fiberglass, carbon, aramid, quartz, ceramic, etc.) and resin (i.e., epoxy, BMI, cyanate ester, etc.) in a truss-type arrangement to yield structural performance. Alternatively, the core layer 42 may incorporate X-Cor™, which is substantially similarly to K-Cor™ except X-Cor™ has sharp pin ends in order to penetrate a prepreg composite facesheet, whereas the pins used in K-Cor™ are bent over and bonded to or between the interlock layers 40, 44 and the respective inboard layer 38 and outboard layer 46.

Both of these core materials are manufactured on computer-controlled machinery utilizing design CAD data for direct core assembly manufacturing. It should be understood that although a particular shape of pins having particular shaped end is disclosed in the illustrated embodiment, other members will benefit from the present invention. Additionally, the pattern of the pins, insertion angle, pin diameter, and the number thereof may be tailored to accommodate various strength and stiffness requirements. Thus, dimensional tolerances are greatly improved over honeycomb core structures, engineering changes/modifications are more easily incorporated, and touch labor is significant reduced due to the automated pin insertion and foam cutting operations. Additionally, both X-Cor™ and K-Cor™ can be tailored, even within the same panel, to accommodate various core strength and stiffness requirements and are not restricted to the traditional honeycomb core "L" and "W" directionality properties.

In the case of the K-Cor™ preforms, the pins 48 which extend beyond the lightweight carrier 50 may be only partially cured. The pins 48 are then folded back over the interlock layers 40, 44 under the action of moderate heat and pressure. That is, after the pins 48 are folded over the interlock layers 40, 44 in a press, the preform may be placed into an oven to complete the cure of the pins 48. The inboard (non-walking surface) layer 38 and the outboard (walking surface) layer 46 are then adhesively bonded onto the respective interlock layers 40, 44 during the final cure. That is, the pins 48 are typically already cured prior to the preform being utilized in the lay up. The present invention involves the use of K-Cor™ with pins 48 that extend through at least one ply of dry composite reinforcement (inboard interlock layer 40 and outboard interlock layer 44) prior to the pins 48 being bent over. This process ensures a mechanical lock between the pins 48 and the inboard interlock layer 40 and the outboard interlock layer 44 resulting in improved structural performance over standard K-Cor™ materials. Moreover, damage tolerance of the floor system (i.e., impact resistance) is also increased.

The interlocked layers 40, 44 require the addition of resin to the ply, which may be accomplished via a ply of film resin (FIG. 4B). The inboard (non-walking surface) layer 38 and the outboard (walking surface) layer 46 are disclosed herein as resin infused or preimpregnated materials. Traditional prepreg autoclave processing in conjunction with resin infusion processing such as, RFI, may also be used to facilitate a lightweight single step manufacturing process.

The inboard layer 38 and the outboard layer 46 material is of a low modulus and high strain to failure capability such as, for example only, fiberglass type materials. Fiberglass materials, however, may be heavier than carbon based materials and, as such, may offer less weight reduction such that, in addition to fiberglass type materials, the inboard layer 38 and the outboard layer 46 may be manufactured from, either singularly or in combination, carbon, S-glass, E-glass, Dyneema®, Spectra®, Kevlar®, etc. depending on the desired loading conditions.

Figure 5A:
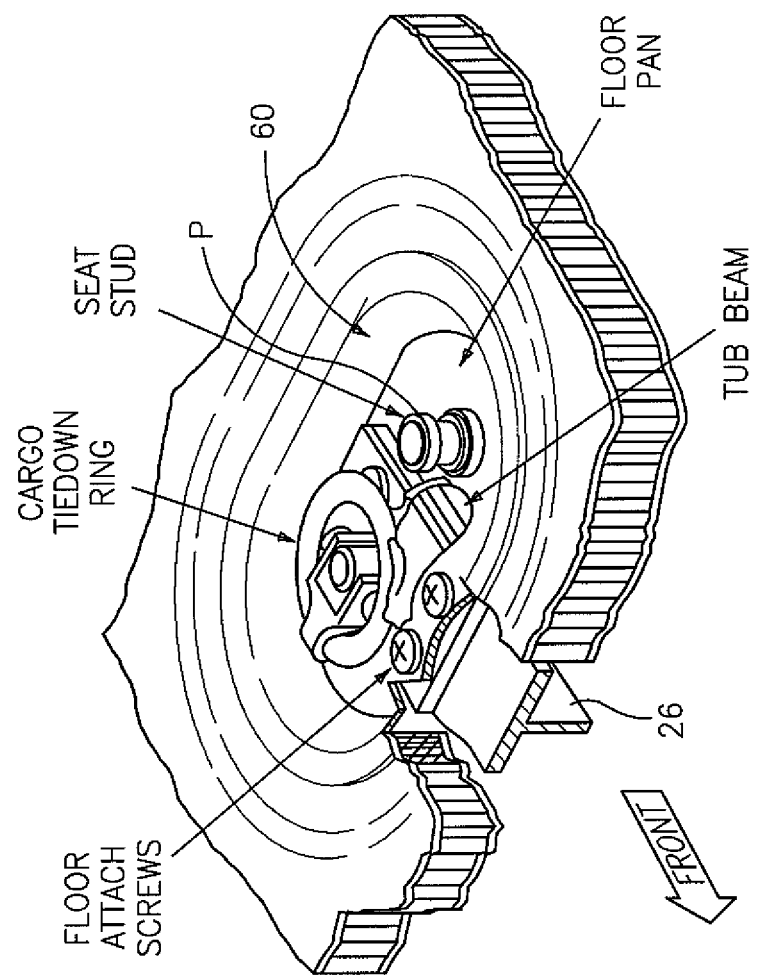
FIG. 5A is a perspective partial fragmentary view of a preformed component recessed within a composite panel according to the present invention.
Figure 5B:
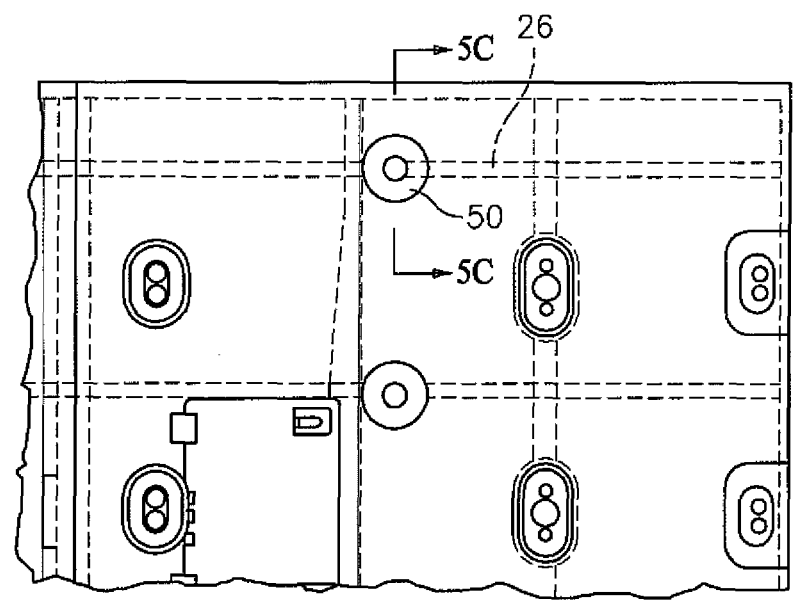
FIG. 5B is an expanded view of the floor panel.
Figure 5C:
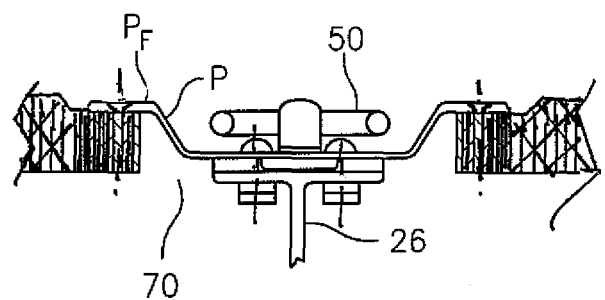
FIG. 5C is a sectional view of the armored floor panel taken along line 5B-5B of FIG. 5A.
Figure 6A:
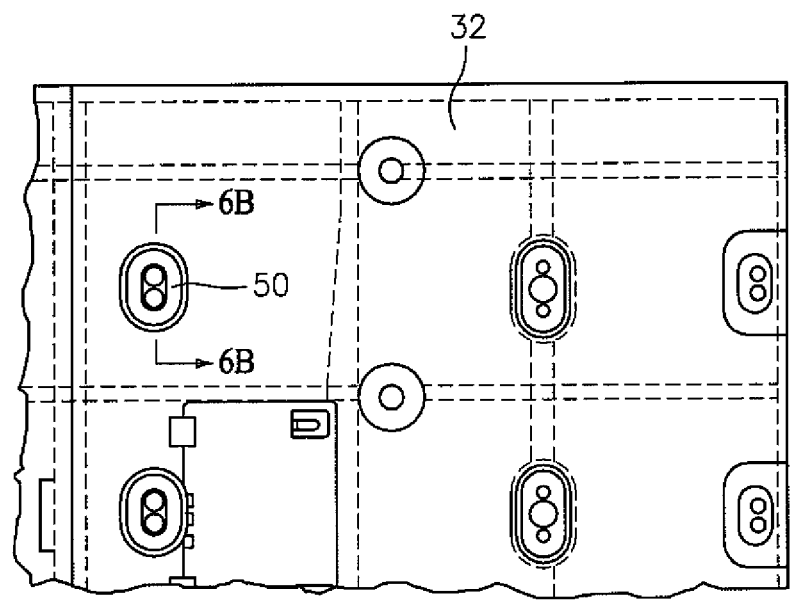
FIG. 6A is an expanded view of a floor panel.
Figure 6B:
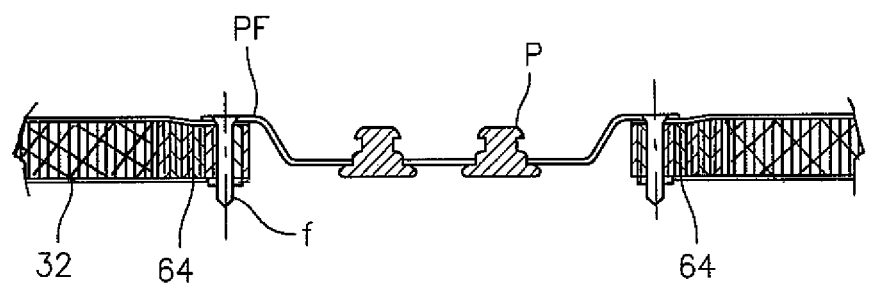
FIG. 6B is a sectional view of the floor panel taken along line 6B-6B of FIG. 6A.

The composite panel 32 facilitates the integration of recessed mounted components P such as cargo tie-downs 60 (FIGS. 5A, 5B, and 5C) and seat pans 62 (FIGS. 6A and 6B) typically required in a rotary-wing aircraft floor system 30.

Figure 7:
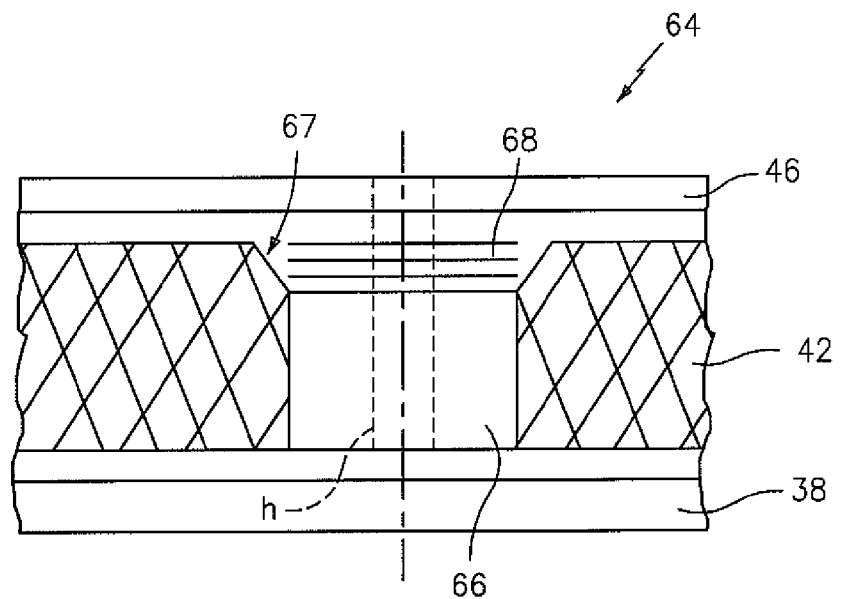
FIG. 7 is a sectional view of a reinforced area.

In general, densification of the core layer 42 is required in reinforcement areas 64 (FIG. 7) where fasteners or preformed components will be transferring load into the composite panel 32. Local densification is achieved through a multiple of closely spaced vertical pins 66 which are perpendicular to the composite panel 32 in the desired reinforcement area 64 (FIG. 7). These vertical pins 66 provide strength equivalent to standard epoxy syntactic materials at a significantly reduced weight (i.e. 20 pcf vs. 45 pcf).

Referring to FIG. 7, the reinforcement area 64 generally includes the multiple of closely spaced vertical pins 66 which are generally equal or slightly shorter than the thickness of the core layer 42. The core layer 42 preferably includes a rebated area 67 during the pressing process when the pins 48 are folded over to form the K-Cor™. The rebated area 67 is a generally recessed or reduced thickness area of the core layer 42 with a generally ramped transition to the primary thickness (also see FIGS. 5A-5C and FIGS. 6A and 6B).

Figure 3A:
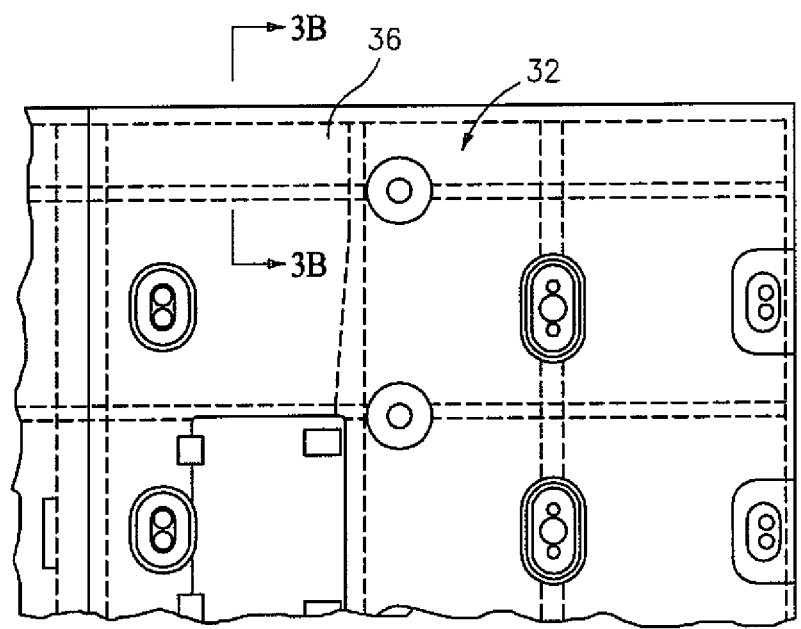
FIG. 3A is an expanded view of a composite floor panel.
Figure 3B:
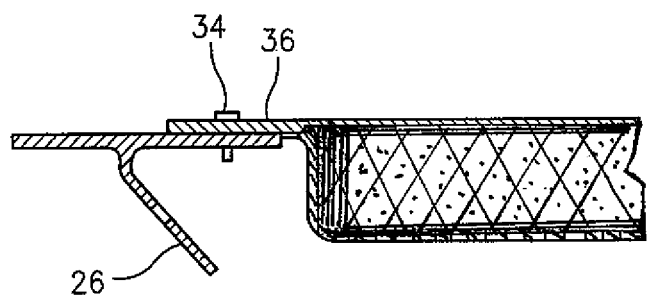
FIG. 3B is a sectional view of the floor panel taken along line 3B-3B of FIG. 3A.

Preferably, the multiple of closely spaced vertical pins 66 fit between the pins 42 of the K-Cor™ to further reinforce the reinforcement area 64. That is, the multiple of closely spaced vertical pins 66 are in addition to the pins 48 of the K-Cor™ in the reinforcement area 64. Additional doubler plies 68 are preferably inserted within the rebated reinforcement area 64 prior to bonding of the inboard (non-walking surface) layer 38 and the outboard (walking surface) layer 46. The reinforcement area 64 essentially densifies a small region of the composite panel 32 such that a hole h can be formed to receive a fastener f. The fastener f, for example, allows the composite panel 32 to readily fastened to the airframe (FIGS. 3A and 3B).

Figure 8:
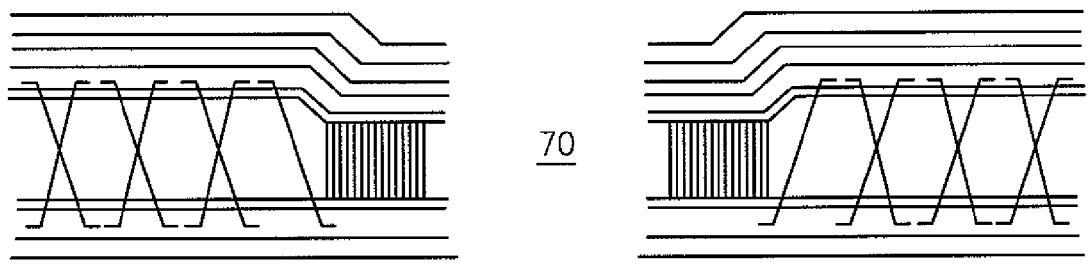
FIG. 8 is an exploded view of a reinforced area adjacent an opening.

Referring to FIG. 8, the reinforcement area 64 may also be located adjacent an opening 70 formed within the composite panel 32 to receive the component P such as the cargo tie-downs 60 (FIGS. 5A, 5B, and 5C) and seat pans 62 (FIGS. 6A and 6B) typical of a rotary-wing aircraft floor system 30. Doubler plies 68 need not be provided as the component P provides a flange area Pf (FIG. 6A) which is engaged within the rebates. The rebated opening likewise receives the inboard (non-walking surface) layer 38 and the outboard (walking surface) layer 46 for receipt of the component P.

It should be appreciated that the composite panel may also be utilized for floor panels and other panels such as in fixed wing aircraft, ground transportation vehicles, etc and that various panel sizes, layer combinations and depth of layers may be utilized and specifically tailored to provide the desired panel.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention. Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A composite panel comprising:
a core layer have a multiple of pins and a multiple of vertical pins, said multiple of pins each provided within said core layer and extending beyond said core layer, said multiple of vertical pins each provided within said core layer without extending beyond said core layer;
an inboard interlock layer having at least one ply mechanically interlocked with said multiple of pins;
an inboard layer bonded to said inboard interlock layer said inboard layer having a first number of plies;
an outboard interlock layer having at least one ply mechanically interlocked with said multiple of pins; and
an outboard layer bonded to said outboard interlock layer, said outboard layer having a second number of plies of a first type and a second type, said first type different than said second type, said second number of plies greater than said first number of plies.

2. The panel as recited in claim 1, wherein said multiple of pins form a truss structure.

3. The panel as recited in claim 1, wherein one end section of each of said multiple of pins are folded over said inboard interlock layer and an opposite end section of each of said multiple of pins are folded over said outboard interlock layer.

4. The panel as recited in claim 1, wherein said multiple of vertical pins form a reinforcement area.

5. The panel as recited in claim 4, wherein said multiple of vertical pins each define a length generally equal to a thickness of said core layer.

6. The panel as recited in claim 4, wherein said core layer defines an at least partially rebated area within said reinforcement area, said at least partially rebated area includes a ramped edge.

7. The panel as recited in claim 6, further comprising a multiple of doubler plies within said at least partially rebated area.

8. The panel as recited in claim 7, wherein said multiple of doubler plies are bonded between said outboard interlock layer and said outboard interlock layer.

9. The panel as recited in claim 4, wherein said reinforcement area is defined adjacent an edge of said composite panel.

10. The panel as recited in claim 9, wherein said reinforcement area defines a fastener hole.

11. The panel as recited in claim 4, wherein said reinforcement area is defined adjacent an opening through said composite panel.

12. The panel as recited in claim 11, further comprising a preformed component mounted at least partially within said opening.

13. The panel as recited in claim 12, wherein said preformed component is a tie-down.

14. The panel as recited in claim 12, wherein said preformed component is a seat pan.

15. The panel as recited in claim 11, wherein said reinforcement area defines a fastener hole.

16. A composite floor panel comprising:
    a core layer having a multiple of pins which form a truss structure and a multiple of vertical pins which form a reinforcement area, said multiple of pins each provided within said core layer and extending beyond said core layer, said multiple of vertical pins each provided within said core layer without extending beyond said core layer;
    an inboard interlock layer having at least one dry composite reinforcement ply mechanically interlocked with said multiple of pins;
    an inboard layer bonded to said inboard interlock layer, said inboard layer having a first number of plies;
    an outboard interlock layer having at least one dry composite reinforcement ply mechanically interlocked with said multiple of pins; and
    an outboard layer bonded to said outboard interlock layer, said outboard layer having a second number of plies of a first type and a second type, said first type different than said second type, said second number of plies greater than said first number of plies.

17. The panel as recited in claim 16, wherein
    said outboard layer is a walking surface comprising:
    at least two outboard plies of said first type;
    at least four inboard plies of said second type, said at least four inboard plies inboard of said at least two outboard plies relative said core layer; and
    at least one resin film ply between said at least two outboard plies and said at least four inboard plies.

18. The panel as recited in claim 17, wherein said inboard layer includes only one ply.

19. The panel as recited in claim 17, wherein said first type is a woven carbon fiber that has a high compression strain.

20. The panel as recited in claim 19, wherein said woven carbon fiber that has a high compression strain is an XN-05 woven carbon fiber.

21. The panel as recited in claim 17, wherein said second type is a plain weave prepreg ply.

22. The panel as recited in claim 21, wherein said second type is an intermediate modulus woven carbon fabric prepreg ply.

23. The panel as recited in claim 17, wherein said inboard layer comprises:
    only one plain weave prepreg ply.

24. The panel as recited in claim 1, wherein
    said outboard layer is a walking surface comprising:
    at least two outboard walking layer plies of said first type;
    at least four inboard plies of said second type, said at least four inboard plies inboard of said at least two outboard walking layer plies relative said core layer; and
    at least one resin film ply between said at least two outboard plies and said at least four inboard plies.

25. The panel as recited in claim 24, wherein said inboard layer comprises:
    only one ply.

26. The panel as recited in claim 25, wherein said only one ply type is a plain weave prepreg ply.

27. The panel as recited in claim 15, wherein each of said multiple of vertical pins are arranged such that a length thereof extends substantially parallel to an axis of said fastener hole, said multiple of pins arranged such that a length thereof is oriented at a non-parallel angle relative to said axis of said fastener hole.

28. The panel as recited in claim 1, wherein said multiple of vertical pins are spaced closer to one another than said multiple of pins are spaced relative to one another.

* * * * *